(12) United States Patent
Aiken et al.

(10) Patent No.: US 9,778,953 B2
(45) Date of Patent: Oct. 3, 2017

(54) PROCESS AND SYSTEM FOR COMPREHENSIVE IT DISCOVERY WITHOUT CREDENTIALS

(75) Inventors: Louis E. Aiken, Houston, TX (US); John K. Baker, Provo, UT (US); Kamal Bhattacharya, Pleasantville, NY (US); Robert P. Boettcher, Katy, TX (US); Murthy V. Devarakonda, Peekskill, NY (US); Nikolai A. Joukov, Thornwood, NY (US); Timothy P. Kane, Sr., Ambler, PA (US); Steve Lee, Jacksonville, FL (US); Matthew A. Markley, Hays, KS (US); Birgit M. Pfitzmann, Valhalla, NY (US); Michael Tacci, Downingtown, PA (US); Norbert G. Vogl, Mahopac, NY (US); Anthony G. D. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 12/485,345

(22) Filed: Jun. 16, 2009

(65) Prior Publication Data
US 2010/0319060 A1  Dec. 16, 2010

(51) Int. Cl.
*G06F 9/44* (2006.01)
*G06F 9/50* (2006.01)
*H04L 29/06* (2006.01)

(52) U.S. Cl.
CPC ............. *G06F 9/50* (2013.01); *H04L 63/10* (2013.01)

(58) Field of Classification Search
CPC ........................................... G06F 9/44
(Continued)

(56) References Cited

U.S. PATENT DOCUMENTS 5,678,044 A  10/1997  Pastilha et al.
5,708,812 A   1/1998  Van Dyke et al.
(Continued)

OTHER PUBLICATIONS

Chen ("Automating Network Application Dependency Discovery: Experiences, Limitations, and New Solutions"), 2008.*
(Continued)

*Primary Examiner* — Jae Jeon
(74) *Attorney, Agent, or Firm* — Scully, Scott, Murphy & Presser, P.C.; Daniel P. Morris, Esq.

(57) ABSTRACT

A method and system for discovering dependencies, configurations and utilizations among IT resources are disclosed. A discovery team writes a prediscovery script without requesting credentials and sends it to a system administrator (SA) who already has necessary credentials to execute the prediscovery script. Then, the SA reviews the prediscovery script and executes the prediscovery script on a target server. While or after executing the prediscovery script, the target server generates a result of an execution of the prediscovery script and provides the result to an analysis system. The analysis system analyzes and parses the result and generates a user-friendly data (e.g., graph or spreadsheet) that represents the result. Then, the analysis system provides the user-friendly data to the discovery team. The analysis system does not require credentials and does not directly communicate with the target server except receiving the result of the executed prediscovery script from the target server.

18 Claims, 3 Drawing Sheets

(58) Field of Classification Search
USPC .............................. 717/121, 120, 130, 131
See application file for complete search history.

(56) References Cited

U.S. PATENT DOCUMENTS

| | | | |
|---|---|---|---|
| 5,832,274 A | 11/1998 | Cutler et al. | |
| 6,052,784 A * | 4/2000 | Day | 726/22 |
| 6,088,451 A * | 7/2000 | He et al. | 726/8 |
| 6,205,480 B1 * | 3/2001 | Broadhurst | H04L 63/0815 707/999.009 |
| 6,259,988 B1 * | 7/2001 | Galkowski | G01C 21/00 340/989 |
| 6,574,197 B1 * | 6/2003 | Kanamaru | H04L 41/12 370/230 |
| 6,609,198 B1 * | 8/2003 | Wood | G06F 21/31 713/155 |
| 6,670,973 B1 * | 12/2003 | Hill et al. | 715/853 |
| 6,735,691 B1 | 5/2004 | Capps et al. | |
| 6,801,940 B1 * | 10/2004 | Moran et al. | 709/224 |
| 6,826,685 B1 * | 11/2004 | Douglas | 713/168 |
| 6,834,298 B1 * | 12/2004 | Singer et al. | 709/220 |
| 6,889,376 B1 | 5/2005 | Barritz et al. | |
| 7,080,159 B2 | 7/2006 | Chu et al. | |
| 7,337,217 B2 * | 2/2008 | Wang | 709/217 |
| 7,379,996 B2 | 5/2008 | Papatla et al. | |
| 7,523,128 B1 * | 4/2009 | Miller et al. | |
| 7,577,722 B1 | 8/2009 | Khandekar et al. | |
| 7,975,028 B2 | 7/2011 | Ryan et al. | |
| 8,279,869 B1 * | 10/2012 | Tran et al. | 370/392 |
| 8,528,071 B1 * | 9/2013 | Kwan | H04L 63/0876 726/14 |
| 8,713,642 B2 * | 4/2014 | Estrada | G06F 21/6218 726/26 |
| 2001/0013096 A1 * | 8/2001 | Luckenbaugh | G06F 17/30861 713/154 |
| 2002/0068559 A1 * | 6/2002 | Sharma | H04W 24/00 455/423 |
| 2002/0161867 A1 * | 10/2002 | Cochran | H04L 29/12009 709/221 |
| 2003/0069960 A1 * | 4/2003 | Symons | H04L 41/085 709/224 |
| 2004/0090922 A1 * | 5/2004 | Jason et al. | 370/252 |
| 2005/0038889 A1 * | 2/2005 | Frietsch | H04L 12/56 709/224 |
| 2005/0120344 A1 | 6/2005 | Asate et al. | |
| 2005/0125768 A1 * | 6/2005 | Wong et al. | 717/100 |
| 2005/0138173 A1 * | 6/2005 | Ha | H04L 29/12113 709/203 |
| 2005/0157654 A1 * | 7/2005 | Farrell | H04L 41/0213 370/241 |
| 2006/0047958 A1 * | 3/2006 | Morais | 713/166 |
| 2006/0053124 A1 * | 3/2006 | Nishio | H04L 67/02 |
| 2006/0075228 A1 * | 4/2006 | Black | H04L 63/0428 713/167 |
| 2006/0122944 A1 * | 6/2006 | Ryan et al. | 705/67 |
| 2006/0123022 A1 * | 6/2006 | Bird | 707/100 |
| 2006/0129415 A1 * | 6/2006 | Thukral | G06Q 10/087 705/28 |
| 2006/0242077 A1 | 10/2006 | Dettinger et al. | |
| 2006/0271656 A1 * | 11/2006 | Yagawa | 709/223 |
| 2007/0171468 A1 * | 7/2007 | Tanji | H04L 29/12047 358/1.15 |
| 2007/0250829 A1 | 10/2007 | Hillier et al. | |
| 2007/0291761 A1 * | 12/2007 | Kauniskangas et al. | 370/395.2 |
| 2008/0072289 A1 * | 3/2008 | Aoki et al. | 726/3 |
| 2008/0098479 A1 * | 4/2008 | O'Rourke | H04L 63/1433 726/25 |
| 2008/0209016 A1 | 8/2008 | Karve et al. | |
| 2008/0228907 A1 * | 9/2008 | Iizuka et al. | 709/223 |
| 2008/0243921 A1 * | 10/2008 | Ellisor | G06Q 10/06375 |
| 2008/0291204 A1 | 11/2008 | Korupolu et al. | |
| 2008/0301076 A1 * | 12/2008 | Timmins et al. | 706/46 |
| 2010/0042980 A1 * | 2/2010 | Wright | G06F 8/4443 717/146 |
| 2010/0106742 A1 * | 4/2010 | Guruswamy | 707/773 |
| 2010/0214947 A1 * | 8/2010 | Dimitropoulos et al. | 370/253 |
| 2011/0093750 A1 * | 4/2011 | Williams | G06F 9/5077 714/47.2 |
| 2011/0119767 A1 * | 5/2011 | Rasizade | G06F 21/10 726/27 |
| 2011/0184934 A1 * | 7/2011 | Lakshminarayan | H03M 7/30 707/718 |
| 2013/0159999 A1 * | 6/2013 | Chiueh et al. | 718/1 |

OTHER PUBLICATIONS

Joukov et al., "Built-to-Order Service Engineering for Enterprise IT Discovery", 2008 IEEE International Conference on Services Computing, Jul. 8-11, 2008.

"A White Paper Discussing Agent vs. Agentless Application Discovery", IBM Corporation.

Zuber, "Virtualization: IBM Insights in Sizing Servers for Virtualization", VMWorld 2006, Sep. 28, 2006.

Mehta et al., "ReCon: A Tool to Recommend Dynamic Server Consolidation in Multi-Cluster Data Centers", Network Operations and Management Symposium, NOMS, IEEE, Apr. 7-11, 2008, pp. 363-370, Salvador, Bahia.

"A Pragmatic Approach to Server and Data Center Consolidation", Platespin, Mar. 2007, www.platespin.com.

* cited by examiner

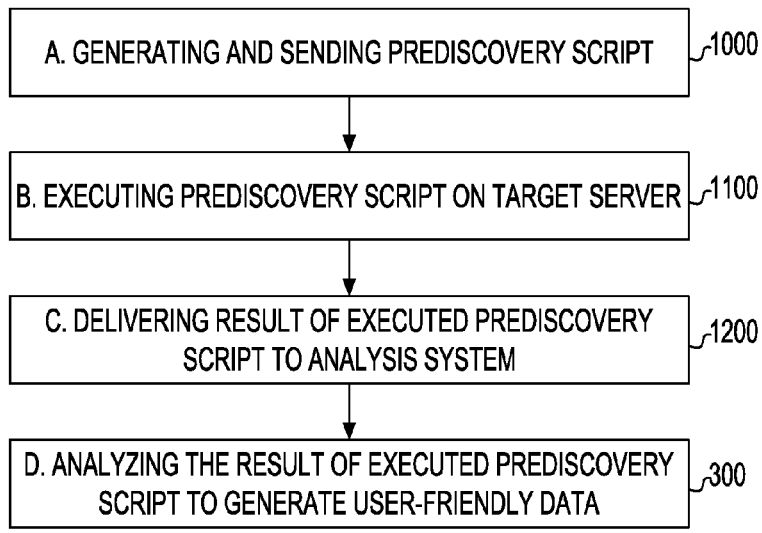
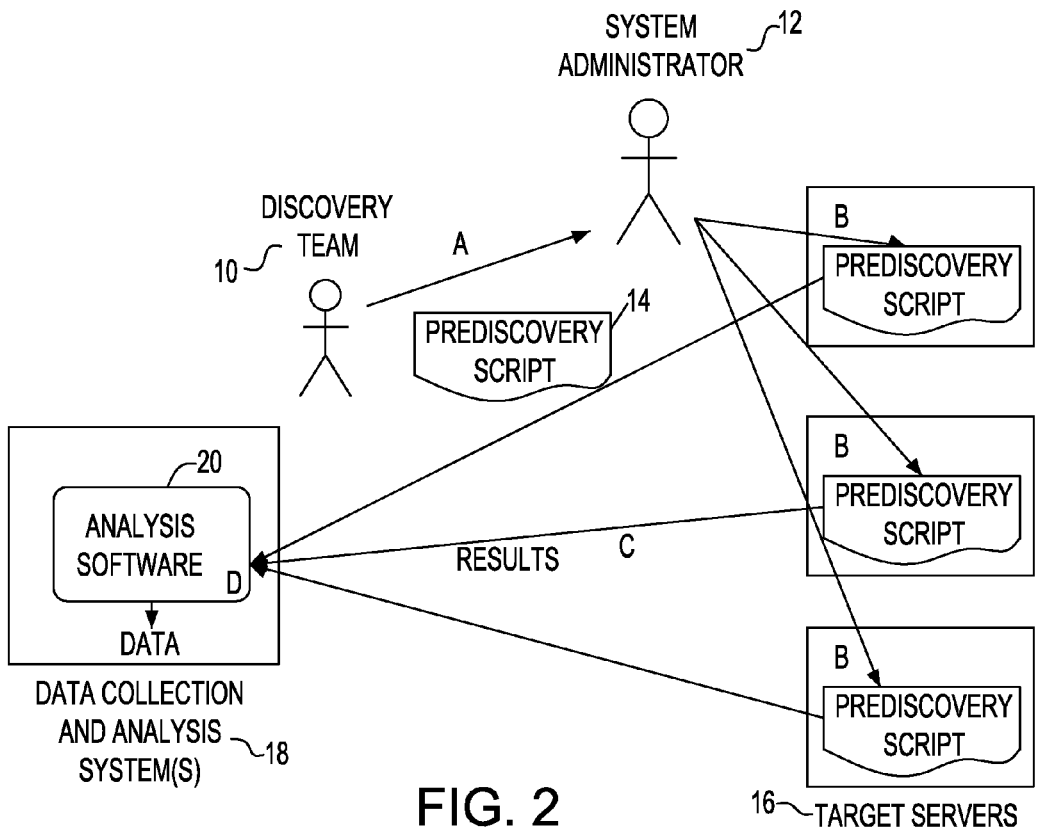

PROCESS AND SYSTEM FOR COMPREHENSIVE IT DISCOVERY WITHOUT CREDENTIALS

BACKGROUND

The present invention generally relates to discovering dependencies, configurations and utilizations among IT (Information Technology) resources. More particularly, the present invention is related to discovering dependencies, configurations and utilizations among IT resources without requesting and obtaining credentials.

An IT resource refers to hardware resource, software resource and a resource combining hardware resource and software resource. The hardware resource may be a mainframe, a server, a peripheral, etc. The software resource may be an operating system, a database management system (DBMS), an application server, etc. The resource combining the hardware resource and the software resource may be a desktop, a laptop, a PDA, etc. A dependency between IT resources refers to how the IT resources are related and how the IT resources cooperate. For example, a dependency of a first component on a second component means that the first component needs the second component to perform its functions. A configuration of an IT resource refers to hardware configuration, software basic configuration and application configuration. The hardware configuration may refer to what processor is operating in the IT resource, how much memory exists in the IT resource, where the IT resource is located in a data center, etc. The software basic configuration may refer to what operating systems are running on an IT resource, what version of the operating system is running on an IT resource. The application configuration may refer to what applications and modules are running in an application server, what URLs are served by a web server, what tables are in a database management system, etc. Utilization of an IT resource refers to how often the IT resource is used, how much capacity the IT resource has, how much free space the IT resource has, how much used space the IT resource has, etc. The utilization further refers to power consumption of an IT resource and memory and network utilization of an IT resource.

Because modern IT systems such as operating systems, file systems, storage devices and databases are complex, it is difficult to know dependencies, configurations and utilizations among each different IT system, especially, dependencies between one IT resource and another IT resource. Manually created charts illustrating the dependencies, configurations and utilizations can have errors and can quickly become outdated. An automatic discovery of IT resources generates a collection of configuration information and dependency information necessary for most IT optimization tasks. The collection of the configuration information may refer to collecting information of hardware configurations, software basic configurations and/or application configurations. The dependency information may refer to which IT resource relies on or relates to which IT resource. The IT optimization tasks may include, but are not limited to, reevaluating and reconstructing IT environment, e.g., a network configuration or a server migration or an application consolidation, to improve operational efficiency, e.g., saving operational cost and increasing network security, and to improve routine maintenance tasks, e.g., mirroring or backing up data.

An IT-to-business relationship is often something that needs to be discovered for maintenance of IT resources. The IT-to-business relationship refers to a mapping indicating which IT resources serve which business purpose. The IT-to-business relationship includes, but is not limited to, which server includes applications or middleware used in a certain business process. Discovering dependencies among IT resources is an important task that helps in discovering IT-to-business relationships.

However, almost all existing automatic IT discovery tools require credentials to access relevant data. The existing automatic IT discovery tools include, but are not limited to, HP® Discovery and Dependency Mapping Software (DDM), EMC® smarts application discovery software and IBM® Tivoli Application Dependency Discovery Manager (TADDM). The credentials refers to access rights, username/password, login ID/password in IT resources, e.g., database management system, file system, etc. The relevant data refers to data required to obtain the dependencies, configurations and utilizations of the IT resources. Sometimes, these credentials cannot be obtained at all, e.g., due to a security reason. If these credentials can be obtained, it takes a long time until obtaining the credentials because of searching users who manage the credentials, having numerous meetings with the users and obtaining approvals of board or users who grant the credentials. Especially, when a currently existing automatic IT discovery tool needs a privileged credential to obtain the relevant data, it is nearly impossible to obtain the privileged credentials, e.g., due to a security concern, a compliance issue and/or a internal standard of an organization. The privileged credential may include, but is not limited to, a root account and a database administrator account. The root account refers to the most privileged account in UNIX® system. A user having the root account can see other user's files and current activities and can create/delete/modify accounts of other users. The database administrator account refers to the most privileged account in a database system. A user having the database administrator account can see tables created by other users and manage accounts of other users. The compliance issue refers to satisfying Sarbanes-Oxley (data and applications used for financial reporting), HIPAA (medical data about patients) or PCI DSS (Payment Card Industry Security Standard), etc. If a system stores data or applications that are controlled by a law like Sarbanes-Oxley, HIPAA or PCI DSS, then there is often requirement that only users that have a direct business need should obtain an access to the system. The internal standard refers to standard extending legal standards.

To avoid obtaining credentials, some existing IT discovery tools rely on a snoop server. The snoop server refers to a server for observing and capturing network traffic for an analysis. For example, SUN® Solaris® operating system provides an administrative snoop command that captures network packets and displays either a summary of the packets in a single line or in a very detailed description. However, the summary of the packets only provides information about packet headers. Network snooping, e.g., snoop command in SUN® Solaris®, is not enough to find out precisely which application programs communicate with each other. Moreover, in a production environment with real data, e.g., a server running a financial application in a bank or managing patient data in a hospital, network snooping often requires authorizations that can be obtained only by a complex approval process, e.g., having numerous meetings to obtain an approval by board members. Having the numerous meetings, explaining to users why credentials are required and/or why discovering dependencies, configurations, and utilizations among IT resources is needed, and finally obtaining necessary credentials to perform a discovery of the IT-to-business relation often takes months and almost always takes more than a couple of days.

However, in many service engagements, i.e., when executing a contract, discovering dependencies, configurations and utilizations among IT resources is required in an early phase that precedes a main activity such as IT optimization. Therefore, waiting a couple of days or months to obtain credentials may be unacceptable in the many service engagements, because a delay of couple of days or months in the early phase may also cause a delay of the main activity in a later phase. Discovering dependencies, configurations and utilizations among IT resources is also desired in an early phase in outsourcing deals in order to assess feasibility of the deals and to help sizing and pricing the deals. In addition, when a client has not signed a contract yet, the client would be more reluctant to provide credentials to discover the dependencies, configurations and utilizations among IT resources.

In addition, people who manage credentials are reluctant to provide credentials to automatic IT discovery tools, because the existing automatic IT discovery tools do not guarantee that the tools do not access files or directories of customer data, e.g., banking customer data, hospital patient data. For example, after obtaining credentials, the currently existing automatic IT discovery tools connect to a target server, e.g., via SSH (Secure Shell), and then execute arbitrary commands in the target server based on an obtained credentials. The target server refers to a server on which something such as middleware or applications is to be discovered. The SSH (Secure Shell) network protocol allows data to be exchanged using a secure channel between two network devices. Furthermore, the tools may install and execute temporary software, i.e., software to be deleted after being executed, in the target server. Because the tools directly communicate with the target servers and execute certain commands without engaging any user who is responsible for managing the target server, the user, who is managing the target server, has very little control over what the tools do on the target server. Especially, the user may want that the tools only perform read operations and that the tools do not access files or directories of security data such as banking files and user's account information. However, the tools are not typically controlled or configured to not access a certain file or directory. It is difficult to verify that the tools do not access a certain file or directory. Therefore, people who manage credentials are more reluctant to assign credentials to the currently existing IT discovery tools.

Therefore, it would be desirable to discover dependencies, configurations and utilizations among IT resources without requesting or obtaining credentials.

BRIEF SUMMARY

The present invention describes a system and method to discover dependencies, configurations and utilizations among IT resources without requesting or obtaining credentials.

In one embodiment, there is provided a method for discovering dependencies, configurations and utilizations among IT resources comprising:

executing at least one prediscovery script on at least one target server;

providing at least one result of the executed prediscovery script to an analysis system to parse and analyze the at least one result to generate data; and providing the data to a user, the data representing one or more of: the dependencies, the configurations and the utilizations among the IT resources, wherein the analysis system does not require credentials and does not directly communicate with the target server except receiving the at least one result of the executed prediscovery script from the at least one target server.

In one embodiment, there is provided a system for discovering dependencies, configurations and utilizations among IT resources comprising:

at least one target server for executing at least one prediscovery script; and an analysis system for receiving at least one result of the executed prediscovery script from the at least one target server and for parsing and analyzing the at least one result to generate data, said analysis system providing the data to a user, the data representing one or more of: the dependencies, the configurations and the utilizations among the IT resources, wherein the analysis system does not require credentials and does not directly communicate with the at least one target server except receiving the at least one result of the executed prediscovery script from the at least one target server.

In a further embodiment, the prediscovery script comprises one or more of: a request to determine currently running processes, a request to determine network statistics, a request for collecting configuration files in the IT resources, a request to enhance or reduce the collected configuration files, a request to determine the dependencies of the IT resources, a request to determine the configurations of the IT resources, a request to determine the utilizations of the IT resources and a request for collecting log files.

In a further embodiment, the user-friendly data is utilized in one or more of: an availability assessment of IT resources, a reliability assessment of the IT resources, an availability improvement of the IT resources, a reliability improvement of the IT resources, an optimization of the IT resources, a consolidation of the IT resources, a server consolidation, a migration of the IT resources, a virtualization of the IT resources, a recovery planning of the IT resources, a stale data elimination in the IT resources, an elimination of unused software in the IT resources, auditing of the IT resources and a compliance assessment and improvement of the IT resources.

One embodiment of the present invention reduces discovering the dependencies, configurations and utilizations of IT resources from months to hours, by discovering the dependencies, configurations and utilizations of IT resources without requesting or obtaining credentials.

BRIEF DESCRIPTION OF THE SEVERAL VIEWS OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings, FIG. 1 illustrates a flow chart of a method employed according to one embodiment of the present invention.

FIG. 2 illustrates a system diagram in one embodiment of the present invention.

DETAILED DESCRIPTION

Figure 3:
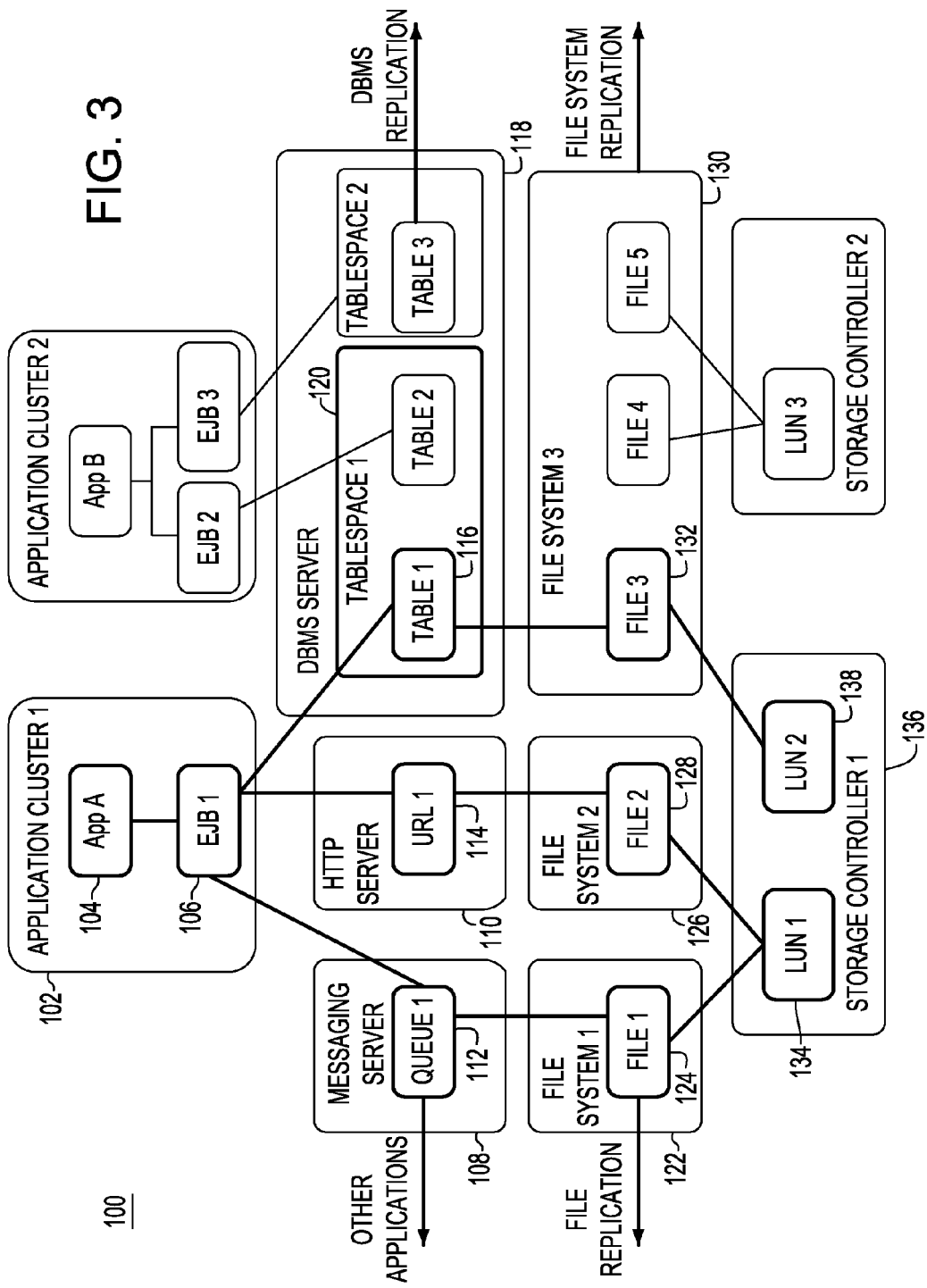
FIG. 3 illustrates an example of user-friendly data generated from the analysis system.

A prediscovery script is written by a discovery team user and executed at a target server by a system administrator (SA), i.e., a user manages a target server or a user who has a highest privilege in the target server and in all the IT resources associated with the target server. The discovery team refers to a user and/or team who is interested in discovering the dependencies, configurations and utilizations among IT resources. Besides the system administrator, any user who has necessary credentials can execute the prediscovery script on the target server. In one embodiment, the prediscovery script is written by one or more scripting languages: Bourne and Korn shell, C shell, MS-DOS® batch, Perl, Python, REXX, Javascript, Ruby, VBScript and Tcl. In one embodiment, the prediscovery script includes one or more of: a request to determine currently running processes on a target server where the script is executed, a request to determine network statistics such as bandwidth utilization of each client connected to a target server where the script is executed, a request for collecting configuration files in IT resources that the script is associated with, a request to determine dependencies among IT resources that the script is associated with, a request to determine configurations in IT resources that the script is associated with, a request to determine utilizations of IT resources that the script is associated with, a request for collecting configuration files, e.g., files that represents how an IT resource is configured, in a target server where the script is executed, a request to determine dependencies of applications and middleware on a target server where the script is executed, a request to enhance or reduce the collected configuration files before sending the collected configuration files to an analysis system for analyzing the collected configuration files (the analysis system is described in detail later), a request to determine configurations, e.g., what processor is operated in the target server, of a target server where the script is executed, a request for collecting log files associated with a target server where the script is executed and a request to determine utilizations, e.g., CPU utilization of the target server, of a target server where the script is executed.

Thus, the prediscovery script may have three requests related to configuration files, e.g., a request for collecting configuration files in the IT resources, a request to enhance the collected configuration files, a request to determine configurations of the IT resources. The prediscovery script may have four requests related to dependencies, e.g., a request to determine currently running processes, a request to determine network statistics, a request to determine the dependencies of the IT resources, and a request for collecting log files. The prediscovery script may have one request related to the utilizations, e.g., a request to determine utilizations of the IT resources. However, the present invention is not limited to the number of requests included in the prediscovery script. In other words, the prediscovery script can include more or less requests related to configuration files. The prediscovery script can include more or less requests related to the dependencies. The prediscovery script can include more or less requests related to the utilizations.

The prediscovery script may further include requests for processes such as inetd, crond, atd, or IBM® WebSphere MQ® that can run other processes on a periodic basis, based on time-out, upon program requests, or upon arrival of external requests, and subsequent requests for configuration, utilizations, and dependencies for these other processes. The inetd refers to a service dispatcher application that runs in the background in a Unix environment. The crond refers to an application running in the background to execute scheduled commands. The atd refers to an application running in the background to execute jobs queued for later execution. The prediscovery script may further include steps that a system administrator should perform such as filtering, compressing, encrypting or processing results of the requests, sending some files to the discovery team, or sending outputs of particular shell commands to the discovery team. In a further embodiment, after sending results of executed prediscovery script or result of the requests, the target server may or may not store the results of executed prediscovery script or the results of the requests.

In one embodiment, the configuration files exist on a target server independent of the prediscovery script. The configuration files exist on a target server before the target server executes a prediscovery script. For example, when a user installs a new application in the target server, the target server asks the user's name, what directory the application is installed in and whether the application should be connected to other server(s). Then, after the user providing corresponding answers, these answers are stored in a configuration file associated with the application. In the present invention, a target server refers to a server where a prediscovery script is executed.

In a further embodiment, the discovery team may write at least one prediscovery script. After the discovery team writes at least one discovery script only once, the discovery team sends the at least one discovery script to at least one user, e.g., at least one SA, who has necessary credentials, e.g., a root account in Unix® system, to execute the at least one prediscovery script on at least one target server. After completing the execution, the at least one target server saves and optionally sends results of executed prediscovery script for a subsequent analysis by an analysis system to generate user-friendly data, e.g., spreadsheet, graph, by parsing and analyzing the results of the executed prediscovery script.

In one embodiment, the at least one user executes the at least one prediscovery script by one of following:
  (1) The at least one user may log into every target server, copy the at least on prediscovery script in the every target server, executes the at least one prediscovery script on the every target server.
  (2) The at least one user may log into every target server, retrieve the at least one prediscovery script from a shared storage device and executes the retrieved script on the every target server.
  (3) The at least one user may have a mechanism to execute the at least one prediscovery script on the at least one target server with one command, e.g., dssh command in Unix® system. The dssh command refers to a command for executing an arbitrary command in parallel on an arbitrary number of hosts.

In one embodiment, the least one target server sends results of executed prediscovery script to an analysis system by one of followings:
  (1) FTP (File Transfer Protocol) or SFTP (SSH File Transfer Protocol)
  (2) File upload using HTTP or HTTPS protocol
  (3) Email file(s) via SMTP (Simple Mail Transfer Protocol), ESMTP (extended SMTP), POP (Post Office Protocol) or IMAP (Internet Message Access Protocol)
  (4) Storing the results in a shared storage device, e.g., by using NFS (Network File System) protocol (5) The at least one target server stores the results and the at least one user sends the results to the analysis system, e.g., by email, ftp, http, etc.

In a further embodiment, the at least one target server or the at least one user stores the results of executed prediscovery script in a collection server, i.e., a server for collecting data from other servers or system administrators. Then, a user who has an access right on the collection server sends the results as a whole by one of: FTP, SFTP, File upload using HTTP or HTTPS, emails, one or more computer readable medium such as a compact disc and a digital versatile disc, etc.

In one embodiment, the prediscovery script is small and simple, e.g., less than 20 lines per IT resource type, enough that a system administrator (SA) can read and understand it. The SA executes the prediscovery script in a target server under the SA's credentials. In other words, the SA has already necessary credentials, e.g., a highest privilege account holder in a target server, to execute the prediscovery script in a target server. Therefore, there is no need to request or obtain credentials,e.g., username/password, access rights, authoritative rights, etc., for discovery team and/or an analysis system, i.e., a system where a result of an executed prediscovery script is sent to and where the result is parsed, collected and analyzed. In one embodiment, the analysis system is entirely outside a target server and a separate entity. When the analysis system directly communicates with the target server to send and execute executable software in the target server, the analysis system is called an on-line sensor. The on-line sensor may require credentials to access the target server and to execute software in the targets server in order to discover dependencies, configurations and utilizations of IT resources associated with the target server. When the analysis system does not directly communicate with the target server except receiving a result of an execution of the prediscovery script, the analysis system is called an off-line sensor. Furthermore, the off-line sensor does not retrieve more data from the target server except receiving a result of an executed prediscovery script. The off-line sensor does not send/ask more queries/commands beyond queries/commands coded in the prediscovery script. Therefore, the off-line sensor may not require credentials, because a SA executes the prediscovery script with his/her credentials in a target server and the off-line sensor does not communicate with the target server.

In one embodiment, the analysis system (e.g., on-line sensor or off-line sensor) is implemented as hardware on a reconfigurable hardware, e.g., FPGA (Field Programmable Gate Array) or CPLD (Complex Programmable Logic Device, using a hardware description language (Verilog, VHDL, Handel-C, or System C). In another embodiment, the analysis system is implemented on a semiconductor chip, e.g., ASIC (Application-Specific Integrated Circuit, using a semi custom design methodology, i.e., designing a chip using standard cells and a hardware description language.

In one embodiment, the analysis system is implemented as software using one or more programming languages, e.g., C, C++, Java, .NET, Perl, Python, etc. In one embodiment, the analysis system is recorded in a computer recordable medium, e.g., CD (Compact Disc), DVD (Digital Versatile Disc), HDD (Hard Disk Drive), as an instruction, e.g., a machine language or assembly language, that is executed by a processor, e.g., Intel® Pentium®, IBM® Power PC®, AMD® Opteron®.

In one embodiment, the analysis system is implemented as hardware through a computing device, e.g., a desktop, a laptop, a mainframe, a workstation, etc., by being executed in the computing device. The computing device comprises, but not limited to include, processor(s), memory(s), display device(s), input/output device(s) and network interface(s).

In one embodiment, the analysis system is executed inside a target server as software agent. The software agent refers to a piece of software that acts for a user or other programs or a piece of software that is capable of acting with a certain degree of autonomy in order to accomplish tasks on behalf of a user or other software. The software agent may require credentials to be executed in the target server.

FIG. 1 is a flow chart illustrating method steps that one embodiment of the present invention employs. At step A (1000), a discovery team writes a prediscovery script and sends the prediscovery script to a SA who has already necessary credentials to execute the prediscovery script in a target server. In one embodiment, the discovery team writes the prediscovery script prior to sending the prediscovery script to the SA. When sending the prediscovery script, the discovery team may not change the prediscovery script at all or may make minor changes such as an address of the analysis system or an address of the collection server. At step B (1100), after receiving the prediscovery script, the SA executes the prediscovery script in the target server under his/her credentials In a further embodiment, the discovery team provides a previously written prediscovery script(s) to users who have necessary credentials to execute the prediscovery script(s). Then, the users execute the prediscovery script(s) on target server(s).

At step C (1200), at the end of executing the prediscovery script in the target server(s), the target server(s) sends a result of the executed prediscovery script to an analysis system. For example, a last line in the prediscovery script may be a command, e.g., ftp, to send the result of the executed prediscovery script to an analysis system. The result may be one or more of: configuration files, log files, lists of system parameters, ASCII files or other data. At step D (1300), the analysis system analyzes the result of the executed prediscovery script and generates user-friendly data, e.g., graphs, spreadsheets, texts, databases, of the result of the executed prediscovery script. The user-friendly data of the result may be used one or more of: an availability assessment of the IT resources such as when an IT resource is available and when an IT resource is unavailable, a reliability assessment of the IT resources such as how frequently an IT resource is crashed or disabled, an availability improvement of the IT resources such as improving the number ports in a router, a reliability improvement of the IT resources such as increasing memory size to prevent a frequent freezing or stalling of an IT resource, an optimization of the IT resources such as reevaluating and reconstructing IT environment to improve operational efficiency, a consolidation of the IT resources such as reducing a total number of IT resources, a server consolidation such as reducing a total number of servers, a migration of the IT resources such as moving an application from a server to another server, a virtualization of the IT resources such as mapping a logical storage device to one or more physical storage devices, a recovery planning of the IT resources such as creating a mirroring server to prepare losing a connectivity of a primary server, a stale data elimination in the IT resources such as deleting data that have not been accessed for last 10 years in a storage device, an elimination of unused software in the IT resources such as deleting software that has not been accessed for 10 years in the IT resources, auditing of the IT resources such as performing inspections or examinations on the IT resources and a compliance assessment and improvement of the IT resources such as verifying whether the IT resources satisfies a standard, e.g., HIPAA.

In one embodiment, steps A (1000)-D (1300) in FIG. 1 are repeated every time with different credentials to obtain enough information, e.g., dependencies, configurations and utilizations among IT resources, to be used for a follow-on process, e.g., IT optimization, IT migration, etc. Executing the steps A (1000)-D (1300) may take a couple of hours including writing the prediscovery script by the discovery team and reviewing the rediscovery script by the SA.

In a further embodiment, when the SA receives the prediscovery script, the SA executes the prediscovery script with normal user credentials i.e., credentials that a normal user holds, without determining a necessary credentials. If the result of the execution of the prediscovery script indicates that a re-execution is required with higher credentials, the SA re-executes the prediscovery script in the target server with privileged credentials, e.g., a root account in UNIX® system or a database administrator account in a database management system. In other words, the SA may adjust a level of credentials, e.g., from a normal user credentials to a privileged credentials, when re-executing the prediscovery script in a target server based on a result of a previous execution of the prediscovery script. In another embodiment, the SA may execute a different prediscovery script on a subset of systems, i.e., a subset of all the target servers, based on a result of a previous execution of the prediscovery script.

FIG. 2 illustrates a system diagram in one embodiment of the present invention. A user or a plurality of users (e.g., discovery team 10) sends a prediscovery script 14 to a SA 12 with a request to review and execute the prediscovery script, after writing the prediscovery script 14. An arrow A between the discovery team 10 and the SA 12 represents the discovery team 10 writing the prediscovery script 14 and providing it to the SA 12, e.g., via an email, FTP, SFTP, a shared storage device, a change management system, i.e., a system used for efficient and prompt handling of all changes on IT resources in order to minimize an impact of any related incidents or services, etc. The arrow A corresponds to the step 1000 (Discovery team sends a prediscovery script) as shown in FIG. 1. When reviewing the prediscovery script, the SA 12 verifies that the prediscovery script 14 does not overwrite or modify any production data, e.g., banking account information in a bank, a patient record in a hospital, or applications, e.g., firewall application, security application, associated with a target server where the script 14 is executed. The SA 12 may further verify whether the script 14 introduces vulnerability, e.g., opening new port, or reads confidential data, e.g., social security numbers of users having accounts in the target server, in a target server where the script 14 is executed.

In one embodiment, the SA 12 functions according to two roles, although not limited to these two roles:

the first role: The SA 12 receives the prediscovery script 14 from the discovery team 10 via an email, FTP, SFTP, instant messaging, shared storage device, change management system, postal mail and carrier service, e.g., UPS®. Then, the SA 12 verifies whether the execution of the prediscovery script 14 is harmless or safe on a target server 16 where the script is executed. If the SA 12 found something suspicious or vulnerable in the prediscovery script 14, the SA 12 contacts the discovery team 10 to ask and discuss the suspicion and the vulnerability. After the discussion with the SA 12, the discovery team 10 may send an updated prediscovery script with corrections on the suspicion and vulnerability. After verifying the prediscovery script 14 or the updated prediscovery script, if a compilation is required to execute the prediscovery script 14 on a target server 16, the SA 12 compiles the prediscovery script 14 or the updated prediscovery script to be an executable program that can be executed in a target server. To compile the prediscovery script 14 or the updated prediscovery script, the SA 12 may utilize a compiler such as GNU compilers.

the second role: The SA 12 provides the compiled executable program or the prediscovery script 14 to a target server 16 that the discovery team indicates 10 in an email or a message associated with the prediscovery script 14.

Then, the target server 16 executes the compiled executable program or the prediscovery script 14 and generates a result of an execution of the prediscovery script 14.

In a further embodiment, after receiving the prediscovery script 14 from the discovery team 10, the system administrator verifies the prediscovery script 14 and executes the verified prediscovery script on the target server 16 without obfuscating or compiling the prediscovery script 14. In another embodiment, a user in the discovery team 10 verifies, obfuscates and compiles the prediscovery script 14 prior to sending the prediscovery script 14 to the SA 12. When the SA 12 receives the prediscovery script 14, which is already verified, obfuscated and compiled, the SA 12 executes the prediscovery script 14 without an additional verification, obfuscation and compilation. In an alternative embodiment, a user who writes the prediscovery script 14 obfuscates and compiles the prediscovery script 14 without verification. Then, the user sends the obfuscated and compiled prediscovery script to the SA 12. The SA executes the obfuscated and compiled prediscovery script without verification on the target server 16, after receiving the obfuscated and compiled prediscovery script.

Arrows B between the SA 12 and the target server(s) 16 indicates that the SA 12 executes the prediscovery script 14 in target server(s) 16 and corresponds to the step 1100 (A system administrator executes a prediscovery script on a target server) shown in FIG. 1. Though there are only three target servers in FIG. 2, there may be a plurality of target servers. Though there is only one prediscovery script in FIG. 2, there may be a plurality of prediscovery scripts. In one embodiment, the target server 16 is a computing device such as a laptop, a desktop, a mainframe, a workstation, etc. In one embodiment, each target server executes a same prediscovery script written by the discovery team 10. In another embodiment, each target server executes each different prediscovery script written by the discovery team 10. In one embodiment, a target server executes a prediscovery script 14 at a regular interval. For example, the SA 12 may set up executing the prediscovery script(s) 14 on the target server(s) 16 as a "cron" job in Unix® system, i.e., an automated process that operates at predefined time intervals. In another embodiment, a target server executes several prediscovery scripts concurrently or sequentially. In one exemplary embodiment, all the UNIX servers execute a prediscovery script, all Apache servers execute another prediscovery script, and all Windows®t servers execute a third prediscovery script.

After executing the prediscovery script 14, the target server 16 sends a result of the execution of the prediscovery script to an analysis system 18. In one embodiment, the result generated by the target server 16 is one or more of:

configuration file(s), log file(s), ASCII file(s), etc. In a further embodiment, there may be several results generated from the target server(s) 16. The results may be generated at the same time or at different times from the target server(s) 16. The target server(s) 16 may send the results at regular intervals or at irregular intervals. Therefore, the result generated by the target server is provided to the analysis system 18 to parse and analyze the result to generate user-friendly data, e.g., a spreadsheet, table, graph, etc. Arrows C between the target server 16 and the analysis system 18 indicates the result of the execution of the prediscovery script that is provided from the target server 16 to the analysis system 18. Arrows C also correspond to the step 1200 (Target server delivers result of executed prediscovery script to analysis system) shown in FIG. 1.

In one embodiment, the analysis system 18 includes analysis software 20, e.g., GOLD parsing system, ANTLR-Works, Grammatica, Spirit, HTML parser, XML parser, etc., for parsing and analyzing the result of the execution of the prediscovery script from the target server 16. In one embodiment, the analysis software 20 is written entirely by the discovery team 10 in a programming language such as Java, Perl, C, C++, .Net, Visual Basics, etc. The analysis system 18 may further include a database such as IBM® DB 2 ® and include reporting features such as BIRT (Business Intelligence and Reporting Tools) and IBM® DB 2® Alphablox®. The analysis system 18 may also include graph visualization software such as Graphviz and Microsoft® Visio®. The analysis system 18 may also include a spreadsheet generator such as Microsoft® Excel®, IBM® Lotus® 1-2-3 and IBM® Lotus® Symphony™. The analysis software corresponds to the step 1300 (Analyze the result of executed prediscovery script to generate user-friendly data) shown in FIG. 1. In a further embodiment, the analysis system 18 generates the user-friendly data, e.g., spreadsheet, based on the parsed and analyzed result of the executed prediscovery script. Then, the analysis system 18 provides the user-friendly data to users, e.g., discovery team or SA. Based on the provided user-friendly data, the users may recognize dependencies, configurations and utilizations of IT resources that the prediscovery script is associated with.

In a further embodiment, the user-friendly data may be provided to an application including, but is not limited to: an availability assessment of IT resources, a reliability assessment of the IT resources, an availability improvement of the IT resources, a reliability improvement of the IT resources, an optimization of the IT resources, a consolidation of the IT resources, a server consolidation, a migration of the IT resources, a virtualization of the IT resources, a recovery planning of the IT resources, a stale data elimination in the IT resources, an elimination of unused software in the IT resources, a decommissioning of certain IT resources, auditing of the IT resources, a compliance assessment and improvement of the IT resources, a security assessment of the IT resources, a risk assessment of the IT resources, a risk assessment of the business processes using the IT resources, an information lifecycle management of the IT resources, a data lineage analysis of the IT resources, a business-value-of-IT assessment of the IT resources, a configuration management of the IT resources. The user-friendly data may also be used in an initial assessment of the price and benefit of one or more of the above uses, e.g., to determine the total cost of ownership or the return on investment of a migration of the IT resources before the decision whether or not to migrate them is made.

FIG. 3 illustrates an example of the user-friendly data generated from the analysis system 18. Though the user-friendly data shown in the FIG. 3 is a graph, the user-friendly data can be represented by a text, spreadsheet, table, etc. In FIG. 3, there are logical layers: (1) a first layer including application clusters; (2) a second layer including a messaging server, HTTP server and DBMS server; (3) a third layer including file systems; and (4) a fourth layer including data storage devices. Though there are only four layers shown in FIG. 3, there may be a plurality of layers in hierarchical structure to illustrate a high-level application such as an enterprise application implemented as Enterprise Java Beans in an application server, middleware such as messaging server, file system and storage. Therefore, in one embodiment, the user-friendly data is illustrated in a hierarchical manner as shown in FIG. 3. In another embodiment, the user-friendly data is configured in a non-hierarchical manner, e.g., no layers.

In FIG. 3, through executing steps 1000-1300 in FIG. 1, the following components are discovered in an organization 100: an application cluster 1 (102), an application cluster 2, a messaging server 108, a http server 110, a DBMS server 118, a file system 1 (122), file system 2 (126), a file system 3 (130), a storage controller 1 (136) and a storage controller 2. In one embodiment, the user-friendly data illustrates configurations of each discovered component. For example, an application cluster 1 (102) includes an application A 104 and an EJB (Enterprise JavaBean) 1 (106). A storage controller 1 (138) includes LUN (logical storage unit) 1 (134) and LUN 2 (138). In a further embodiment, the user-friendly data indicates dependencies among discovered components. For example, an application A 104 is associated with an EJB 1 (106). The EJB 1 (106) is associated with a queue 1 (112) in a messaging server 108, a URL 1 (114) in a HTTP server 110 and a table 1 (116) in tablespace 1 (120) in a DBMS server 118. The queue 1 (112) is associated with a file 1 (124) in a file system 1 (122). The URL 1 (114) is associated with a file 2 (128) in a file system 2 (126). The table 1 (116) is associated with a file 3 (132) in the file system 3 (130). The file 1 (124) and file 2 (128) are associated with a LUN 1 (134) in the storage controller 1 (136). The file 3 (132) is associated with a LUN 2 (138) in the storage controller 1 (136). In one embodiment, the user-friendly data illustrates utilizations of discovered components. For example, the user-friendly data may indicate or describe how frequently the application A 104 is invoked and how much free space exists in the LUN 1 (134). The user-friendly data may further indicate each file size in the file systems (a file system 1, a file system 2 and a file system 3).

In one embodiment, the prediscovery script 14 implements a small number, e.g., 10 to 30, of code lines per middleware, e.g., Database Management System, Apache HTTP server, IBM® WebSphere® application server. In one embodiment, logic is implemented to select a specific prediscovery script when multiple prediscovery scripts are provided to the SA 12. In this embodiment, if the discovery team 10 or the SA 12 has prior knowledge, the discovery team 10 can write a specific prediscovery script for a specific target server where the discovery team 10 has prior knowledge. For example, if the discovery team 10 or the SA 12 knows that there is no database management system (DBMS) associated with any target server, the discovery team 10 or the SA 12 deletes part(s) related to the DBMS in the prediscovery script. If an IT discovery tool, e.g., IBM® Tivoli Application Dependency Discovery Manager (TADDM), was previously operated and the IT discovery tool found out a specific target server is a printer server and the discovery team 10 or the SA 12 knows a printer server does not have DBMS, then the discovery team 10 or the SA 12 deletes part(s) related to the DBMS in a prediscovery script 14 which is executed in the printer server. The SA 12 also can choose a specific prediscovery script, e.g., a prediscovery script not associated with DBMS, to execute the specific prediscovery script in a specific target server such as printer server, if the SA 12 has prior knowledge about the specific target server, e.g., whether the specific server has DBMS and/or whether the specific server is a printer server.

In one embodiment, there is implemented logic to adjust coverage of the prediscovery script 14. The coverage of a prediscovery script refers to a range in which the prediscovery script is applied. Alternatively, the coverage refers to a range in which the prediscovery script can find dependencies, configurations and utilizations among IT resources. If the prediscovery script 14 is simple or short, the coverage of the prediscovery script may be narrow, or it may not be optimized for resource usage. If the prediscovery script 14 is lengthy, the coverage of the prediscovery script can be extended, or it can be more optimized for resource usage, e.g., selecting specific configuration files or even parameters from configuration files before sending a configuration file, rather than simply sending an entire directory including all the configuration files. In another embodiment, if a prediscovery script is executed in a limited number of target servers in an organization, discovered information such as dependencies among IT resources is limited, e.g., discovering dependencies among the limited number of target servers and their related applications. If the prediscovery script is executed all the target servers in the organization, discovered information is diverse and broad, e.g., discovering all dependencies among all the IT resources in the organization.

In an IT migration, a first application and its dependent applications may be migrated from a server to another server. Then, the SA 12 first executes a prediscovery script 14 on a target server including the application. A result of this execution discovers dependent applications of the first application. Then, the SA 12 executes the prediscovery script 14 on target servers including the discovered dependent applications. This execution may discover additional dependent applications of the first application. Then, SA 12 executes the prediscovery script 14 on target servers including the additional dependent applications. In this manner, i.e., gradually executing a prediscovery script on a target sever where a dependency is discovered, the SA 12 and/or the discovery team 10 can find out dependencies of the first application without executing the prediscovery script 14 on all the target servers.

In one embodiment, there is a FAQ (Frequently Asked Question) server that receives and answers questions from a SA 12. By accessing the FAQ server, a SA 12 can see other SA's questions and answers for the questions. A SA 12 can also send questions related to the prediscovery script 14 to the discovery team 10 through the FAQ server.

In one embodiment, the analysis system 18 transforms a result of an execution of the prediscovery script to be used for follow-on process, e.g., IT optimization or IT migration, by utilizing a parsing or analyzing technology.

Figure 4:
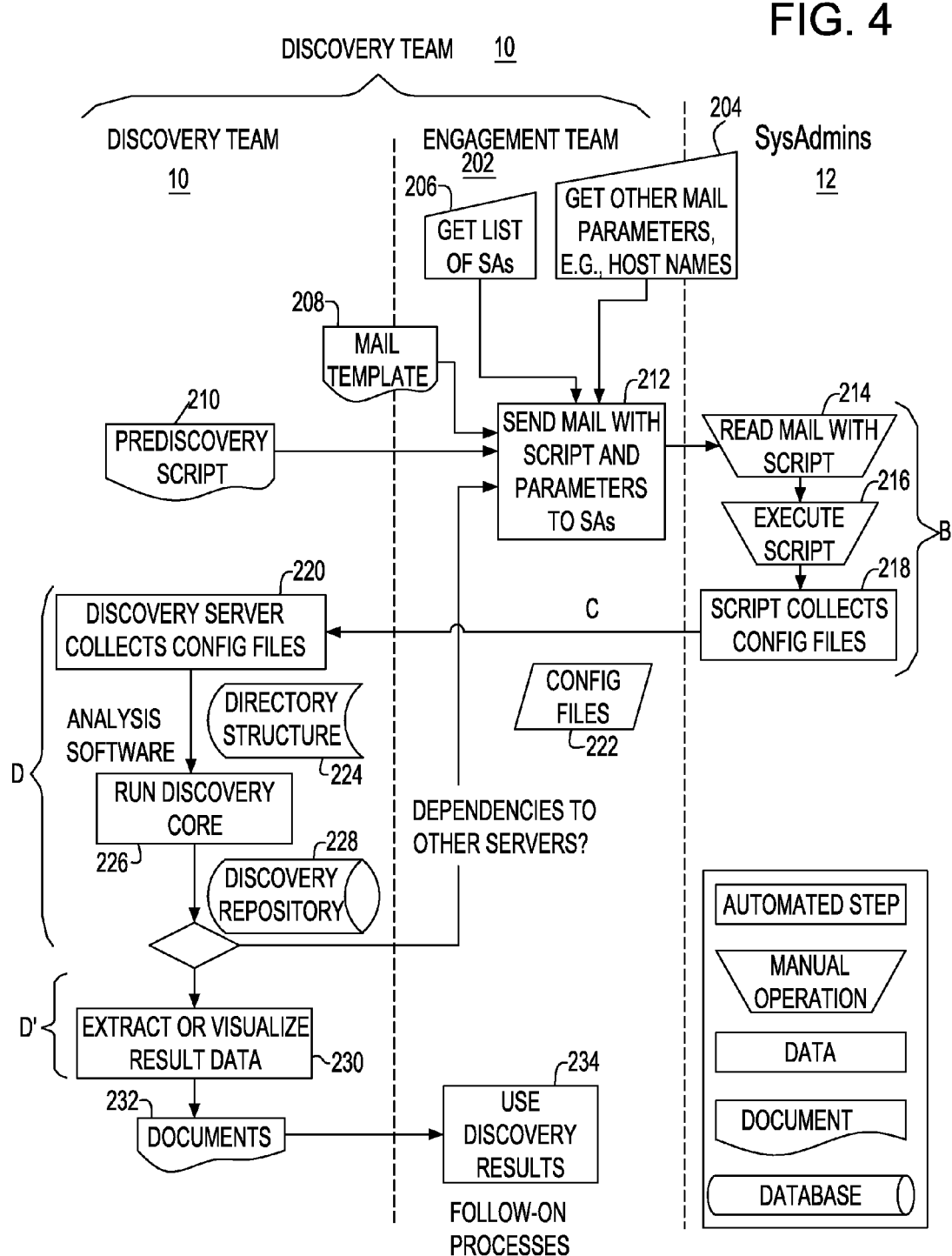
FIG. 4 illustrates a flow chart of a method employed according to one embodiment of the present invention.

FIG. 4 illustrates method steps that one embodiment of the present invention employs. A discovery team 10 refers to a user or a team who write a prediscovery script 14 and/or has an analysis system 18. An engagement team 202 refers to a user or a team who utilizes the user-friendly data, e.g., graphs or spreadsheet that visualizes a result of an execution of the prediscovery script, to make a contract or to execute the contract. In one embodiment, the discovery team 10 includes the engagement team 202. In one embodiment, the discovery team 10 includes, but is not limited to, 1 to 500 users. The engagement team 10 includes, but is not limited to 1 to 1,000 users. The system administrators (SAs) 12 are the users who read/verify the prediscovery script 14 and execute the prediscovery script 14 in target servers 16. In one embodiment, the discovery team 10 is users who are responsible for discovering dependencies, configurations or utilizations among IT resources. The discovery team 10 may be users doing a reliability assessment in IT resources, migrations of IT resources, consolidation of IT resources, etc. In one embodiment, the discovery team 10 can be any users who are interested in discovering dependencies, configurations or utilizations among IT resources.

At step 204, the engagement team 202 obtains from customer(s) a list of target servers where the prediscovery script 14 is executed. In one embodiment, if the engagement team 202 does not prepare the list of target servers, the system administrators 12 execute the prediscovery script 14 on all the target servers that the SAs 12 manage. At step 206, the engagement team 202 obtains from the customer(s) a list of SAs who receive the prediscovery script 14. At step 208, the engagement team 202 prepares a mail template for the prediscovery script 14. The mail template (e.g., a mail header) may facilitate receiving a fast and positive response from the SAs after sending the prediscovery script 14 to the SAs 12.

At step 210, the discovery team 10 writes the prediscovery script 14, e.g., by a shell scripting language. In one embodiment, the discovery team 10 may write multiple prediscovery scripts. A first prediscovery script may include simple and common commands, e.g., a "ps" command in UNIX for finding currently running processes and a "netstat" command in UNIX for finding a current network statistics that may be generally executed in a target server 16 with a normal user credential. A second prediscovery script may include special commands that require a more privileged credential, e.g., root rights on an operating system or database administrator rights. The SAs 12 may separately execute the second prediscovery script on a target server 16 on a demand, after executing the first prediscovery script on the target server 16. The same prediscovery script may also contain both types of commands, and find more or less information depending on whether it is run with normal user credentials or privileged credentials. In one embodiment, the discovery team 10 writes the prediscovery script(s) 14 long before sending the prediscovery script(s) 14 to the SAs 12.

In one embodiment, the discovery team 10 writes the prediscovery script 14 with a separate section per a middleware and per an operating system. The discovery team 10 may further write a comment per each section or each command. Each separate section and comments may help that the SAs 12 verifies the prediscovery script 14.

In one embodiment, after executing the prediscovery script 14, a target server 16 displays a short successful message, e.g., "the prediscovery script is successfully executed". Then, the target server 16 automatically provides a result of the executed prediscovery script to an analysis system 18. The result of the executed prediscovery script may be provided as one or more files, e.g., binary code file(s), text file(s), ASCII file(s), configuration file(s), tar file(s), encrypted file(s), or compressed file(s), from the target server 16 to the analysis system 18. The tar file, encrypted file or compressed file may include multiple text files and/or configuration files.

In one embodiment, when writing the prediscovery script 14, the discovery team 10 considers a resource usage or a resource requirement, e.g., how much memory space is required to store a result of an execution of the prediscovery script, to execute the prediscovery script 14. For example, if a target server 16 that executes the prediscovery script 14 does not have enough memory to store configuration files, the discovery team 10 writes the prediscovery script 14 not to store all the configuration files in a temporary directory. The SAs 12 may evaluate whether executing the prediscovery script 14 on the target server 16 overflows a currently available memory space.

In one embodiment, if the discovery team 10 knows a resource constraint, e.g., a limited memory space is allowed, a limited CPU time is allotted, a limited network bandwidth is allotted, etc., the discovery team 10 may write the prediscovery script 14 by adopting or optimizing the resource constraint. For example, the discovery team 10 may write a prediscovery script 14 to compress its execution result, if there is limited memory space. The discovery team 10 may write the prediscovery script to send its execution result in phases, i.e., sending its result piece by piece at a certain interval, if limited network bandwidth is allowed. In other hand, if there is enough network bandwidth, the discovery team 10 may write the prediscovery script to send its execution result in a large file.

In one embodiment, the discovery team 10 may not need any credential to write the prediscovery script 14. In another embodiment, the discovery team 10 may have credentials for the analysis system to parse and analyze a result of an execution of the prediscovery script 14. However, the discovery team 10 does not have any credentials for target servers 16.

Returning to FIG. 4, at step 212, the discovery team 10 sends the prediscovery script 14 to the engagement team 202, after the discovery team 10 writes the prediscovery script 14. Then, the engagement team 202 combines the prediscovery script 14, the mail template, the list of SAs and the list of target servers into a mail and sends the mail to the SAs 12 on the list of SAs. To send the mail, the engagement team 202 may utilize an email, FTP, instant messaging, postal mail and/or carrier service. In one embodiment, the engagement team 202 combines the prediscovery script 14, the mail template, the list of SAs and the list of target servers into file(s), e.g., tar file(s), encrypted file(s), compressed file(s), text file(s), multimedia file(s). Then, the engagement team 202 provides the files to the SAs 12 on the list of SAs by utilizing a shared storage device where the files are stored, a web site where the files can be downloaded, etc. In another embodiment, the engagement team 202 stores the prediscovery script 14, the mail template, the list of SAs and the list of target servers in computer readable medium(s). Then, the engagement team 202 provides the computer readable medium to the SAs 12.

In one embodiment, the engagement team 202 provides the files, the mail or the computer readable medium(s) to users, e.g., SAs, who have sufficient credentials to execute the prediscovery script(s) 14 on the target server(s) 16. It is understood that such users can be anyone who can execute the prediscovery script(s) 14 on the target server(s) 16 with sufficient credentials, i.e., privileged credentials such as a root account in Unix® system.

At step 214, after receiving the mail, the SAs 12 or other users read the prediscovery script 14 in the mail, files or computer readable mediums to validate that executing the prediscovery script 14 does not violate authorizations and responsibilities that the SAs 12 or other users have. If SAs 12 or other users think that executing the prediscovery script 14 may include an unauthorized task, e.g., reading credit card number or social security number of a customer, or potential concern, e.g., executing the prediscovery script 14 on a target server 16 may exhaust all the available memory space in the target server 16, the SAs 12 or other users may contact the engagement team 202 and/or the discovery team 10, e.g., via an email, instant messaging, FTP, postal mail, carrier service or the FAQ server, to address this unauthorized task or potential concern. Then, the discovery team 12 may resend a new prediscovery script which does not perform the unauthorized task and which resolves the potential concern. The SAs 12 or other users may validate again whether the new prediscovery script is safe or harmless to execute on a target server 16.

After the SAs 12 or other users validated the prediscovery script 14, the SAs 12 or other users executes the prediscovery script 14 on target servers 16 which are on the list of the target servers. In one embodiment, while or after executing the prediscovery script 14, the SAs 12 or other users may notice a warning generated from the prediscovery script 14 or a warning generated from the target server(s) 16. Subsequently, the SAs 12 or other users may contact the engagement team 202 or the discovery team 10 to address the warnings. After the target server 16 completes the execution of the prediscovery script 14, the SAs 12 or the users may validate a result of the execution of the prediscovery script 14, e.g., whether the execution of the prediscovery script 14 collected all necessary information such as dependencies among IT resources, configurations in the IT resources, resource utilization rate in the IT resources. While or after executing the prediscovery script 14, the SAs 12 or the users may evaluate resource utilization, e.g., how much memory space does the execution of the prediscovery script 14 require, of the execution of the prediscovery script 14. After completing the execution of the prediscovery script 14, each target server may automatically send a result of an execution of the prediscovery script 14 to an analysis system 18. In one embodiment, as shown at step 218, the target servers 16 collect configuration files, i.e., results of executions of the prediscovery script on the target servers, and then compress the configuration files into a file, e.g., zip file, rar file, tar file. At step 222, the target servers 16 provide the configuration files to an analysis system 18.

At step 220, the analysis system 18 receives the configuration files. At step 224, the analysis system extracts a directory structure from the configuration files. The directory structures may reveal how directories, i.e., folders including files, in the target servers 16 are organized. At step 226, the analysis system 18 analyzes and parses the configuration files by using the analysis software 20. In one embodiment, a configuration file has a file name or an internal attribute that indicates a target server 16 from which the configuration file is generated. While or after analyzing and/or parsing the configuration files, the analysis system 18 may match the target servers 16 on the list of target servers and the file names or internal attributes of the configuration files. While or after performing the matching, if the analysis system 18 finds out the analysis system 18 did not receive configuration file(s) from a target server 16 on the list of target servers 16, the analysis system 18 notifies the discovery team, the engagement team, or a SA of the target server 16, which did not provide configuration file(s), to execute the prediscovery script 14 on the target server 16 and then to provide the configuration files, i.e., a result of an execution of the prediscovery script, through the target server 16.

While or after analyzing and/or parsing the configuration files, the analysis system may describe on the analyzed and parsed configuration file that more information on a particular target server needs to be collected, e.g., by executing a long prediscovery script including simple and common commands as well as rare and complex commands. Then, the discovery team 10 writes the long prediscovery script and provides the long prediscovery script to an SA to execute the long prediscovery script. In one embodiment, the discovery team 10 writes the long prediscovery script long before providing the long prediscovery script to the SA.

In one embodiment, the configuration files are manually analyzed without using an analysis system 18, e.g., IBM® TADDM or an application for analyzing the results of the executed prediscovery scripts. During this manual analysis, the discovery team 10 may contact SAs 12 or other users to ask questions, e.g., whether the SAs 12 or other users can re-execute the prediscovery script 14 under a privileged credentials, without sending the prediscovery script 14.

At step 228, the analysis system 18 stores the analyzed and parsed configuration files in a storage device (discovery repository or a database), e.g., a magnetic disk, hard disk, optical disk, compact disc, digital versatile disc, solid state drive. The analysis system 18 may further store an original result of an execution of the prediscovery script, in a storage device (discovery repository or a database). If the analyzed and parsed configuration files finds there is a dependency on an outside target server, i.e., a target server that is not on the list of the target servers, the analysis system 18 sends the prediscovery script 14 to a SA managing the outside target server to request an execution of the prediscovery script 14 on the outside target server. In a further embodiment, if the analysis system 18 finds a dependency on an outside target server, the analysis system 18 contacts the engagement team 202 to obtain an address, e.g., email address or IP address, of a SA who manages the outside target server. Then, the analysis system 18 sends prediscovery script(s) 14 to the SA to request an execution of the prediscovery script(s) 14 on the outside target server.

If the analyzed and parsed configuration files reveal that the prediscovery script 14 needs to be re-executed on specific target server(s) 16 under a different parameter, e.g. executing the prediscovery script 14 under a privileged credential instead of under a normal user credential, then the analysis system 18 asks corresponding SA(s) 12 to re-execute the prediscovery script 14 on the specific target server(s) 16 under the different parameter. When asking the re-execution, the analysis system 18 may send the analyzed and parsed configuration files to the SA(s) 12 via an automated FTP, instant messaging, email, etc.

At step 230, the analysis system 18 generates a user-friendly data by visualizing, filtering and/or transforming the analyzed and parsed configuration files. The user-friendly data may illustrate the analyzed and parsed configuration files through graph(s), spreadsheet(s), text(s), formula(s) and symbol(s). At step 232, the user-friendly data is transformed to a document, e.g., Microsoft® Excel® file, Microsoft® Word® file, Microsoft® PowerPoint® file, OpenOffice document, PDF file, Lotus® Symphony file. In one embodiment, the user-friendly data and the document are stored in a storage device (data repository; a database). At step 234, the document is provided to the engagement team 202 for a follow-on process, e.g., IT optimization or IT migration.

In one embodiment, there may be a feedback step (not shown) to improve a step, e.g., generating/modifying a mail template at step 210, based on reaction of the SAs 12 or other users.

In one embodiment, the SAs 12 may set up a repeated task that automatically executes the prediscovery script 14 at a certain interval. Therefore, the SA does not need to perform any manual work since setting up the repeated task. Then, steps 216-234 may be automatically repeated at a certain interval.

In one embodiment, the step 212 corresponds to the step A (1000) in FIG. 2. Steps 214-218 correspond to the step B (1100) in FIG. 2. The step 222 corresponds to the step C (1200) in FIG. 2. Steps 220, 224, 226 and 228 correspond to the step D in FIG. 1. The step 230 may also correspond to the step D (1300) in FIG. 1. In a further embodiment, one or more of steps 220 and 224-232 may be performed on the target server(s) 16 by describing a corresponding request on the prediscovery script(s) 14. The target server(s) may perform the corresponding request before sending results of the executed prediscovery script(s) to the analysis system 18.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in computer systems—are able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) executed by a processor (e.g., Intel® Core™ 2, IBM® PowerPC®) for causing a computer to perform method steps of this invention. The present invention may include a method of deploying a computer program product including a program of instructions in a computer readable medium for one or more functions of this invention, wherein, when the program of instructions is executed by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for discovering dependencies, configurations and utilizations among IT resources comprising:

preparing at least one prediscovery script, the at least one prediscovery script associated with the discovering the dependencies, the configurations and the utilizations among the IT resources;

obfuscating the prepared prediscovery script;

sending the obfuscated prediscovery script to at least one user who has a privilege on at least one target server to run the obfuscated prediscovery script in the at least one target server;

running the obfuscated prediscovery script on said at least one target server on a list to configure said at least one target server to discover the dependencies, the configurations and the utilizations among the IT resources and further to configure the at least one target server to prevent accessing files or directories that include financial information;

discovering, based on the dependencies of the at least one target server, at least one outside server which is not on the list;

running the obfuscated prediscovery script on the discovered outside server;

providing to an analysis system at least one result of the running of the obfuscated prediscovery script on the at least one target server and the at least one outside server to parse and analyze the at least one result to generate data;

providing the generated data to a user, the generated data representing the dependencies, the configurations and the utilizations among the IT resources and the at least one outside server, the generated data excluding the files or the directories that include the financial information, determining from the generated data whether the obfuscated prediscovery script needs to be re-executed on a specific target server under a different parameter representing a different level of privilege, wherein the at least one user can adjust a level of privilege when re-executing the obfuscated prediscovery script in the at least one target server based on the at least one result of the run prediscovery script, the level of privilege including: a normal user privilege and a root user privilege; and determining from the generated data an optimization of the IT resources, said optimization including a reconstructing of an IT environment of said IT resources for operational efficiency, said reconstructing of an IT environment comprising: moving of an application from one server to another server, and eliminating an unused software application and/or stale data in the IT resources, wherein the eliminating of the unused software application or stale data comprises respectively: deleting an software application of the IT resources that has not been accessed for a ore-determined amount of time, or deleting data that has not been accessed for a pre-determined amount of time, wherein the generated data is utilized in a virtualization of the IT resources, mapping a logical storage device to one or more physical storage devices, and wherein the analysis system does not require user privileges, does not directly communicate with the at least one target server except receiving the at least one result of the run prediscovery script from the at least one target server, and the dependencies, the configurations and the utilizations among the IT resources, including discovering dependent applications of a first application on said at least one target server and dependencies among a number of target servers and their related applications, are discovered without requiring user privileges, wherein the discovering dependencies include discovering which application programs communicate with each other.

2. The method according to claim 1, further comprising:

obtaining a list of the at least one user who receives the obfuscated prediscovery script;

and obtaining the list of the at least one target server where the obfuscated prediscovery script is run.

3. The method according to claim 1, wherein the at least one prediscovery script comprises requests for one or more of: a request to determine currently running processes, a request to determine network statistics, a request for collecting configuration files in the IT resources, a request to enhance or reduce the collected configuration files, a request to determine the dependencies of the IT resources, a request to determine the configurations of the IT resources, a request to determine the utilizations of the IT resources and a request for collecting log files.

4. The method according to claim 1, further comprising: storing the result of the run prediscovery script or the generated data in a database.

5. The method according to claim 1, wherein the generated data is utilized in one or more of: an availability assessment of the IT resources, a reliability assessment of the IT resources, an availability improvement of the IT resources, a reliability improvement of the IT resources, a server consolidation, a server migration, an auditing of the IT resources and a compliance assessment and improvement of the IT resources.

6. The method according to claim 5, wherein the reliability improvement of the IT resources comprises: planning a recovery of the IT resources by creating a mirroring server to prevent losing a connectivity of a primary server.

7. The method according to claim 5, wherein said availability assessment of the IT resources comprises: determining when an IT resource is available and when an IT resource is unavailable, and an availability improvement of the IT resources comprises: improving a number of ports in a router.

8. The method according to claim 5, wherein said reliability assessment of the IT resources comprises: determining how frequently an IT resource is crashed or disabled, and a reliability improvement of the IT resources comprises: increasing a size of a memory resource to prevent a frequent freezing or stalling of the IT resource.

9. The method according to claim 1, wherein the running the obfuscated prediscovery script on the target server requires a highest privilege on the target server, the discovering the dependencies requires no privilege on the target server, and the preparing the prediscovery script requires no credential on the target server.

10. The method according to claim 1, further comprising:
implementing logic to adjust a coverage of the obfuscated prediscovery script, the coverage being a range in which the prediscovery script can find dependencies, configurations and utilizations among said IT resources.

11. The method according to claim 1, further comprising:
optimizing said prediscovery script according to a known resource constraint, the constraint comprising one or more of: a limited memory space to store results, a limited CPU time allotted, a limited network bandwidth allotted.

12. A system for discovering dependencies, configurations and utilizations among IT resources comprising:
a computing system being used by a user for preparing at least one prediscovery script, the at least one prediscovery script associated with the discovering the dependencies, the configurations and the utilizations among the IT resources;
the computing system obfuscating the prepared prediscovery script; wherein the user preparing the prediscovery script sends the obfuscated prediscovery script to at least one user who has a privilege on at least one target server to run the obfuscated prediscovery script in the at least one target server;
the at least one target server running obfuscated prediscovery script for discovering one or more of: the dependencies, the configurations and the utilizations among the IT resources while preventing the at least one target server from accessing files or directories that include financial information and discovering, based on the dependencies of the at least one target server, at least one outside server which is not on the list;
the discovered outside server running the obfuscated prediscovery script; an analysis system for receiving at least one result of the running of the obfuscated prediscovery script on the at least one target server and the at least one outside server;
the analysis system for parsing and analyzing the at least one result to generate data, said analysis system providing the generated data to a user, the generated data representing one or more of: the dependencies, the configurations and the utilizations among the IT resources and the at least one outside server, the generated data excluding the files or the directories that include the financial information, and
determining from the generated data whether the obfuscated prediscovery script needs to be re-executed on a specific target server under a different parameter representing a different level of privilege, wherein the at least one user can adjust a level of privilege when re-running the prediscovery script in the target server based on the result of the run prediscovery script, the level of privilege including: a normal user privilege and a root user privilege; and
determining from the generated data an optimization of the IT resources, said optimization including a reconstructing of an IT environment of said IT resources for operational efficiency, said reconstructing of an IT environment comprising: moving of an application from one server to another server, and eliminating an unused software application and/or stale data in the IT resources, wherein the eliminating of the unused software application or stale data comprises respectively: deleting an software application of the IT resources that has not been accessed for a pre-determined amount of time, or deleting data that has not been accessed for a pre-determined amount of time, wherein the generated data is utilized in a virtualization of the IT resources, mapping a logical storage device to one or more physical storage devices, and
wherein the analysis system does not require user privileges, does not directly communicate with the at least one target server except receiving the at least one result of the run prediscovery script from the at least one target server, and the dependencies, the configurations and the utilizations among the IT resources, including discovering dependent applications of a first application on said at least one target server and dependencies among a number of target servers and their related applications, are discovered without requiring user privileges, wherein the discovering dependencies include discovering which application programs communicate with each other.

13. The system according to claim 12, wherein a second team
obtains, from customers, a list of the at least one user who receive the obfuscated prediscovery script; and
obtains, from the customers, the list of the at least one target server where the obfuscated prediscovery script is run.

14. The system according to claim 12, wherein the at least one prediscovery script comprises requests for one or more of: a request to determine currently running processes, a request to determine network statistics, a request for collecting configuration files in the IT resources, a request to enhance or reduce the collected configuration files, a request to determine the dependencies of the IT resources, a request to determine the configurations of the IT resources, a request to determine the utilizations of the IT resources and a request for collecting log files.

15. The system according to claim 12, wherein the generated data is utilized in one or more of: an availability assessment of the IT resources, a reliability assessment of the IT resources, an availability improvement of the IT resources, a reliability improvement of the IT resources, a server consolidation, a server migration, auditing of the IT resources and a compliance assessment and improvement of the IT resources.

16. The system according to claim 12, wherein said prediscovery script implements logic to adjust a coverage of the obfuscated prediscovery script, the coverage being a range in which the prediscovery script can find dependencies, configurations and utilizations among said IT resources.

17. The system according to claim 12, wherein said prediscovery script is optimized according to a known resource constraint, the constraint comprising one or more of: a limited memory space to store results, a limited CPU time allotted, a limited network bandwidth allotted.

18. A computer program product comprising a computer readable medium that excludes only a propagating signal, the computer readable medium embodying computer program instructions being run by a processor for causing a computer to perform method steps for discovering dependencies, configurations and utilizations among IT resources, said method steps comprising the steps of claim 1.

* * * * *